(12) United States Patent
Bitauld et al.

(10) Patent No.: US 10,063,323 B2
(45) Date of Patent: Aug. 28, 2018

(54) FIBER-BASED COMMUNICATION

(71) Applicant: Nokia Technologies Oy, Espoo (FI)

(72) Inventors: David Bitauld, Cambridge (GB); Joachim Wabnig, Upper Cambourne (GB); Antti Niskanen, Cambridge (GB); Hongwei Li, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/316,869

(22) PCT Filed: Jun. 9, 2014

(86) PCT No.: PCT/FI2014/050464
§ 371 (c)(1),
(2) Date: Dec. 7, 2016

(87) PCT Pub. No.: WO2015/189456
PCT Pub. Date: Dec. 17, 2015

(65) Prior Publication Data
US 2017/0104546 A1    Apr. 13, 2017

(51) Int. Cl.
| H04B 10/85 | (2013.01) |
| H04B 10/70 | (2013.01) |
| H04B 10/54 | (2013.01) |
| H04B 10/548 | (2013.01) |
| H04B 10/2507 | (2013.01) |
| H04J 14/06 | (2006.01) |

(52) U.S. Cl.
CPC ......... *H04B 10/85* (2013.01); *H04B 10/2572* (2013.01); *H04B 10/541* (2013.01); *H04B 10/548* (2013.01); *H04B 10/70* (2013.01); *H04J 14/06* (2013.01)

(58) Field of Classification Search
CPC .. H04B 10/85; H04B 10/2572; H04B 10/541; H04B 10/548; H04B 10/70; H04J 14/06
USPC .......................................................... 398/40
See application file for complete search history.

(56) References Cited

U.S. PATENT DOCUMENTS

| 9,641,326 B2 | 5/2017 | Wabnig et al. |
| 2006/0072922 A1 | 4/2006 | MacDonald et al. |
| (Continued) | | |

FOREIGN PATENT DOCUMENTS

| EP | 1499040 A2 * | 1/2005 | ............. H04B 10/70 |
| EP | 1499040 A2 | 1/2005 | |
| WO | WO-2014/042822 A2 | 3/2014 | |

OTHER PUBLICATIONS

Thomas-Peter, Nicholas L., et al. "Phase-controlled photonic quantum circuits in laser written integrated optics." *Quantum Electronics and Laser Science Conference*. Optical Society of America, 2010.

*Primary Examiner* — Dalzid Singh
(74) *Attorney, Agent, or Firm* — Mintz Levin Cohn Ferris Glovsky and Popeo, P.C.

(57) ABSTRACT

In accordance with an example embodiment of the present invention, there is provided an apparatus comprising a dual-rail encoder (120) configured to receive light from a light source and to output dual-rail encoded light, a combiner (130) configured to convert the dual-rail encoded light into polarization encoded light, and at least one processing core configured to obtain compensation adjustment information concerning a fiber (145) and to control the dual-rail encoder (120) based at least in part on the compensation adjustment information.

25 Claims, 11 Drawing Sheets

(56) References Cited

U.S. PATENT DOCUMENTS

| | | |
|---|---|---|
| 2006/0290941 A1 | 12/2006 | Kesler et al. |
| 2010/0309469 A1 | 12/2010 | Kanter et al. |
| 2012/0251028 A1* | 10/2012 | Yaman .................... G02F 1/01 385/1 |
| 2013/0084079 A1 | 4/2013 | Nordholt et al. |
| 2013/0322809 A1* | 12/2013 | Goh .................. H04B 10/5161 385/3 |

* cited by examiner

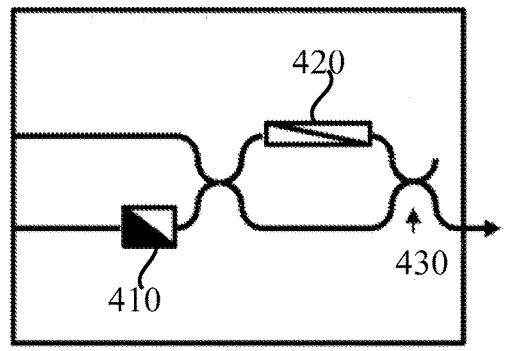
FIGURE 4A
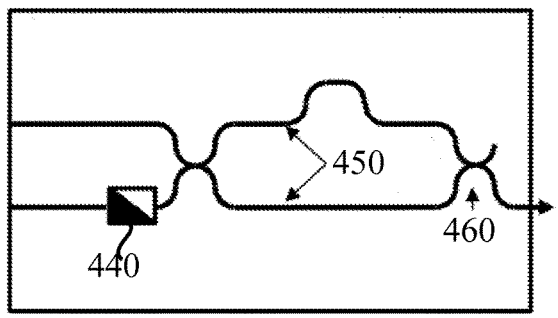
FIGURE 4B
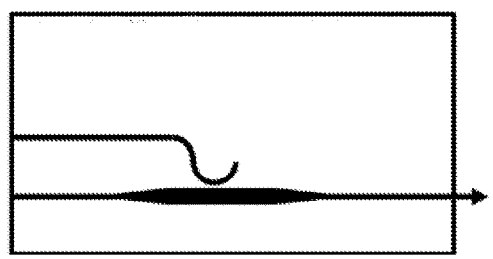 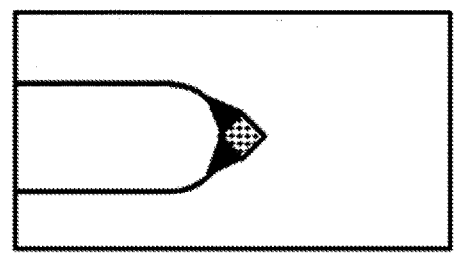
FIGURE 4C        FIGURE 4D

FIBER-BASED COMMUNICATION

CROSS REFERENCE TO RELATED APPLICATIONS

This application is a national-phase entry of Patent Cooperation Treaty Application No. PCT/FI2014/050464, entitled "FIBRE-BASED COMMUNICATION," which has an international filing date of Jun. 9, 2014, which is incorporated by reference herein in its entirety.

FIELD OF INVENTION

The present invention pertains to the field of fibre-based communication, such as for example polarization-division multiplexing or quantum key distribution.

BACKGROUND OF INVENTION

Information may be secured in a number of ways. Information that is confidential in nature may comprise financial, medical, corporate, political or personal information, for example.

Confidential information may be stored in secure premises, preventing accidental or malicious access to the information by placing it in a locked place, such as for example in a safe in an office. Corporate locations may be further, or alternatively, provided with alarm systems, guards, fences and/or other access control functions.

Confidential information may be stored in computers that are not connected to any unsecure networks, to prevent unauthorized network intrusion therein to obtain the information. Such computers may be referred to as "air walled" computers as they have no connection to unsecure networks.

One way to prevent unauthorized access to confidential information is encryption, wherein a plaintext, for example a text in a natural language, such as French, is converted to a ciphertext using an encryption algorithm and a key. Encryption algorithms are designed to render it very difficult to obtain the plaintext from the ciphertext without the key. In general, ciphertext may be known as encrypted information.

In quantum communication, QC, two parties may exchange information encoded in quantum states. The quantum states, or qubits, may comprise specially defined properties of photons such as pairs of polarization states, such as 0° and 90°, or circular basis states such as left-handedness and right-handedness. Through quantum communication, the two parties may produce a shared random series of bits known only to them, which can then be used as secret keys in subsequent encryption and decryption of messages. A third party can, in theory, eavesdrop on the QC between the two parties. Such eavesdropping perturbs the QC, however, introducing anomalies that the two intended parties can detect. The two parties may post-process the results of the QC to remove any partial information acquired by an eavesdropper, and form shared secret keys from the remaining information resulting from the QC.

An eavesdropper intercepting and re-transmitting a photon comprised in a quantum communication can only guess the original sending basis when it re-encodes and re-transmits the photon toward its original destination. The receiver may detect the eavesdropping since for subsets of bit values for which sending basis and measuring basis are found to match, parity values should match exactly, assuming the communication system is well tuned and free from imperfections in transmission and reception. Discrepancies in bit values introduced by eavesdropping enable the transmitter and receiver to detect eavesdropping and correct the secret keys.

SUMMARY OF THE INVENTION

In accordance with a first aspect of the present invention, there is provided an apparatus comprising a dual-rail encoder configured to receive light from a light source and to output dual-rail encoded light, a combiner configured to convert the dual-rail encoded light into polarization encoded light, and at least one processing core configured to obtain compensation adjustment information concerning a fibre and to control the dual-rail encoder based at least in part on the compensation adjustment information.

Various embodiments of the first aspect may comprise at least one feature from the following bulleted list:

- the at least one processing core is configured to obtain the compensation adjustment information by causing the apparatus to transmit first polarization-encoded light over the fibre, to receive feedback concerning reception of the transmitted first polarization-encoded light and to compare the feedback to information concerning the first polarization-encoded light
- the dual-rail encoder is configured to modify at least one of amplitude and phase properties of the received light
- the dual-rail encoder is configured to modify at least one of amplitude and phase properties of the received light in at least one of two waveguides
- the dual-rail encoder comprises at least one phase shifter
- the at least one phase shifter is configurable by applying at least one of a voltage and an optical signal
- the dual-rail encoder comprises at least one coupler
- the combiner comprises a fibre-based polarization beam splitter
- the apparatus further comprises an attenuator configured to reduce an intensity of at least one of the dual-rail encoded light, polarization encoded light and the light from the light source to a single-photon regime.

In accordance with a second aspect of the present invention, there is provided an apparatus comprising at least one decoder configured to measure encoded light in at least two different bases, and at least one processing core configured to obtain compensation adjustment information concerning a fibre and to cause adjusting of at least one of the encoded light and an output of the at least one decoder based at least in part on the compensation adjustment information.

Various embodiments of the second aspect may comprise at least one feature from the following bulleted list:

- the at least one decoder comprises at least one photodetector or single-photon detector
- the apparatus further comprises a polarization rotator combiner configured to convert incoming polarization encoded light to dual-rail encoded light, and wherein the at least one decoder is configured to measure the dual-rail encoded light
- the at least one decoder comprises decoding elements, such as for example 1×2, 2×2 or 4×4 couplers, allowing each detector to perform a measurement on a given direction from a given basis
- the at least one processing core is configured to obtain the compensation adjustment information by comparing a first output of the at least one decoder to first information received from a second apparatus, the first information characterizing a transmission of light that the at least one decoder measured to produce the first output the compensation adjustment information corrects a distortion caused by birefringence of the fibre the adjusting is performed on the dual-rail encoded light the apparatus is configured to measure polarization encoded light encoded in at least two different bases In accordance with a third aspect of the present invention, there is provided a method, comprising encoding light received from a light source to produce dual-rail encoded light, converting the dual-rail encoded light into polarization encoded light, obtaining compensation adjustment information concerning a fibre, and controlling the encoding based at least in part on the compensation adjustment information.

Various embodiments of the third aspect may comprise at least one feature corresponding to a feature from the preceding bulleted list laid out in connection with the first aspect.

In accordance with a fourth aspect of the present invention, there is provided a method comprising measuring encoded light in at least two different bases, obtaining compensation adjustment information concerning a fibre, and causing adjusting of at least one of the encoded light and an output of at least one detector based at least in part on the compensation adjustment information.

Various embodiments of the fourth aspect may comprise at least one feature corresponding to a feature from the preceding bulleted list laid out in connection with the second aspect.

In accordance with a fifth aspect of the present invention, there is provided an apparatus comprising means for encoding light received from a light source to output dual-rail encoded light, means for converting the dual-rail encoded light into polarization encoded light, means for obtaining compensation adjustment information concerning a fibre, and means for controlling the encoding based at least in part on the compensation adjustment information.

In accordance with a sixth aspect of the present invention, there is provided an apparatus, comprising means for measuring encoded light in at least two different bases, means for obtaining compensation adjustment information concerning a fibre, and means for causing adjusting at least one of the encoded light and an output of the at least one means for measuring based at least in part on the compensation adjustment information.

In accordance with a seventh aspect of the present invention, there is provided a non-transitory computer readable medium having stored thereon a set of computer readable instructions that, when executed by at least one processor, cause an apparatus to at least encode light received from a light source to output dual-rail encoded light, convert the dual-rail encoded light into polarization encoded light, obtain compensation adjustment information concerning a fibre, and control the encoding based at least in part on the compensation adjustment information.

In accordance with an eighth aspect of the present invention, there is provided a non-transitory computer readable medium having stored thereon a set of computer readable instructions that, when executed by at least one processor, cause an apparatus to at least measure encoded light in at least two different bases, obtain compensation adjustment information concerning a fibre, and cause adjusting of at least one of the encoded light and an output of at least one decoder based at least in part on the compensation adjustment information.

INDUSTRIAL APPLICABILITY

At least some embodiments of the present invention find industrial applicability in improving communication over fibres and/or distribution of encryption keys.

BRIEF DESCRIPTION OF THE DRAWINGS

FIGS. 4A-4D illustrate example embodiments of combiners capable of converting dual-rail encoded light to polarization-encoded light;

DETAILED DESCRIPTION OF EXAMPLE EMBODIMENTS

Most fibres used for communication do not preserve the polarization of light during propagation through the fibre. Compensating for rotation of polarization in a fibre when qubits are dual-rail encoded may enable a compact and fully integrated implementation on a chip for both emitter and receiver.

Dual-rail encoding may be implemented on two waveguides, which may be parallel. Information is encoded on the relative phase and amplitudes of the light in the two waveguides. Operations on the relative phase and amplitudes can be performed by phase shifters on at least one of the two waveguides and by optical couplers between the two waveguides. A light source, dual-rail encoder and polarization rotator-combiner could be fabricated monolithically on the same chip or using substrates of different materials by heterogeneous/hybrid integration, for example. A polarization rotator-combiner may rotate the polarization of the light coming from one waveguide with respect to the polarization of the light coming from the other waveguide and combine the light of the two waveguides in a single spatial optical mode. In general, dual-rail encoding may thus comprise modifying at least one of amplitude and phase of the light in at least one of the two waveguides.

Figure 1A:
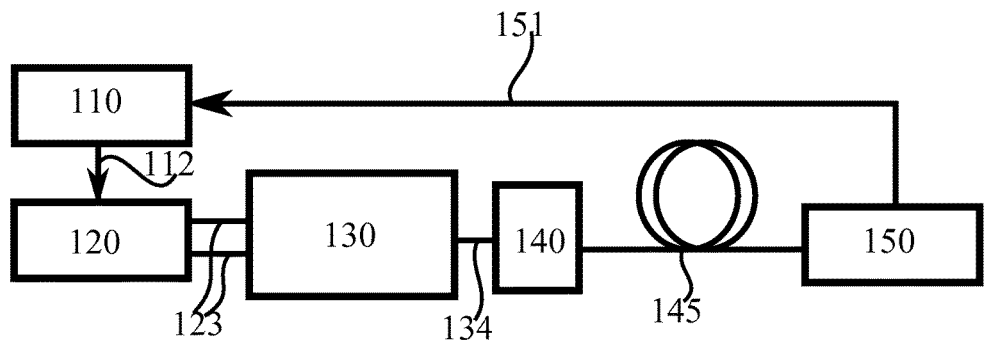
FIG. 1A illustrates an example system capable of supporting at least some embodiments of the present invention.

FIG. 1A illustrates an example system capable of supporting at least some embodiments of the present invention. FIG. 1A illustrates an emitter and receiver 150 with two communication channels arranged thereinbetween. The emitter comprises controller 110, dual-rail encoder 120, combiner 130 and attenuator 140. The communication channels comprise fibre 145 and connection 151.

Controller 110 may comprise, for example, a field-programmable gate array, FPGA, microcontroller, microprocessor, processor or other controller. Controller 110 is configured to, via connection 112, control functioning of dual-rail encoder 120. Connection 112 may comprise an electrical lead internal to a device comprising both controller 110 and dual-rail encoder 120, for example.

Dual-rail encoder 120 may comprise, for example, an apparatus comprising at least one or two phase shifters, arranged along one or two of two rails, or paths, that lead light at least in part via the at least one or two phase shifters, to encode at least one photon in either of two orthogonal modes, or bases. Phase shifters in a dual-rail encoder may be arranged along one or both of the two rails. Phase shifters may comprise, for example, voltage-controlled crystal-based phase shifters. Dual-rail encoder 120 may comprise a light source, such as for example a laser light source, or it may be arranged to receive light from a light source external to dual-rail encoder 120. Where dual-rail encoder 120 is arranged to receive light from a light source external to dual-rail encoder, the light source may be coupled to dual-rail encoder 120 by flip-chip bonding or optical wire-bonding, for example. Where dual-rail encoder 120 comprises a light source, the light source may transmit light internally in the dual-rail encoder, and such light may likewise be received internally in dual-rail encoder 120 for encoding. Dual-rail encoder 120 may output light via connection 123.

Combiner 130 may comprise a polarization rotator-combiner. Combiner 130 may comprise, for example, a fibre-based polarization beam splitter or free space. Combiner 130 may be configured to receive from dual-rail encoder 120 dual-rail encoded light and to convert it into polarization encoded light. Such conversion may be based at least in part on polarization rotation-combination, for example. Combiner 130 may output light via connection 134.

Attenuator 140 may comprise, for example, a configurable attenuator enabled to reduce an intensity of light incoming into the attenuator. In detail, attenuator 140 may be enabled to reduce pulses of light to a single-photon regime. A single-photon regime may comprise that a pulse of light comprises approximately one photon. A single-photon regime may comprise that a pulse of light comprises approximately one to five photons. Attenuator 140 may comprise a detector configured to measure an intensity of an incoming light pulse or beam, to assist in selecting an attenuation factor to apply to the incoming beam or pulse. Attenuator 140 may be controllable, for example by controller 110, to attenuate incoming light either to a single-photon regime or to a higher intensity. A higher intensity may be usable during calibration of the communication system of FIG. 1A, for example, to transmit a test pattern. Although illustrated as being disposed between combiner 130 and fibre 145, attenuator 140 may alternatively be disposed in other parts of the emitter.

Fibre 145 may comprise an optical fibre arranged, or capable of being arranged, between the emitter and receiver 150. Fibre 145 may exhibit birefringence, wherein imperfections in the fibre, stress and/or bending of the fibre may cause polarization of photons passing through the fibre to rotate. Birefringence of fibre 145 may be time-varying as temperatures of sections of the fibre may change, the fibre may be physically rearranged to change the bends it is arranged in, or the number of physical imperfections in the fibre may increase with time. The core of fibre 145 may comprise glass or transparent plastic, surrounded by a layer of material with a lower index of refraction, such as a different glass or plastic, for example. Fibre 145 may also cause, at least in part, attenuation of light passing through it and/or depolarization of light passing through it.

Receiver 150 may be enabled to convert polarization-encoded light, received via fibre 145 from the emitter, to dual-rail encoded light, and to detect the dual-rail encoded light, for example in two different bases. Alternatively or additionally, receiver 150 may be configured to detect polarization-encoded light, for example when detecting a test pattern.

Connection 151 enables receiver 150 to transmit information to the emitter, for example to controller 110, concerning detection of light at receiver 150. Connection 151 may comprise an optic fibre, an electrical cable or at least in part a wireless connection, for example. Communication taking place over connection 151 may be encrypted, for example the emitter and the receiver may perform a diffie-hellman exchange over connection 151 to establish secrecy, if desired. The emitter may request a signed certificate from receiver 150 to ascertain the identity of receiver 150, and/or vice versa.

Figure 1B:
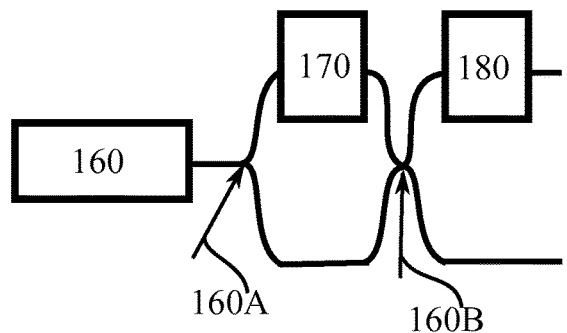
FIG. 1B illustrates an example embodiment of dual-rail encoder 120 of FIG. 1A.

FIG. 1B illustrates an example embodiment of dual-rail encoder 120 of FIG. 1A. The illustrated dual-rail encoder comprises a light source 160, which may comprise a laser, such as for example a continuous-wave or modulated laser. Light from the light source 160 is led to dual rails via a 1×2 coupler pointed to by arrow 160A. Along the upper rail is disposed phase shifter 170. After phase shifter 170, the dual rails are joined at 2×2 coupler 160B, and diverged again wherein phase shifter 180 is disposed in the upper rail. Although illustrated in the example of FIG. 1B as being on the upper rail, in other embodiments phase shifts may be applied on both rails to encode, with equal effect, light passing through dual-rail encoder 120. Phase shifters 170 and 180 may be configured to encode light into dual-rail encoded states.

Figure 1C:
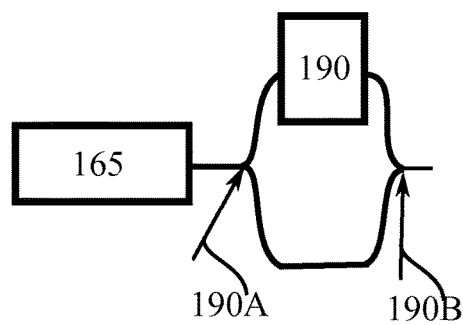
FIG. 1C illustrates an example embodiment of a modulated source.

FIG. 1C illustrates an example embodiment of modulated source of FIG. 1B. Light source 165 is in this example arranged to feed light, via 1×2 coupler 190A, to phase modulator 190. After phase modulator 190, 1×2 coupler 190B joins the two rails.

In use, the emitter may output a test pattern, for example on at least two bases, to receiver 150. Characteristics of the test pattern may be known beforehand by receiver 150, or the emitter may alternatively or additionally inform receiver 150 of characteristics of the test pattern via connection 151 or fibre 145. The emitter may alert receiver 150 that the test pattern is incoming over fibre 145, so receiver 150 can prepare to detect the incoming test pattern.

Receiver 150 detects the test pattern, and informs the emitter of results of measurements comprised in the detection of the test pattern, via connection 151, for example. Controller 110, being in possession of information characterising the test pattern before it was input to fibre 145, and of information characterizing results of measurements comprised in the detection of the test pattern after its traversal of fibre 154, is thereby enabled to deduce an extent of rotation of polarization that birefringence of fibre 154 imparts to light traversing it. Compensation adjustment information may be derived, based on the deduced extent of rotation, in controller 110 to enable pre-compensating for rotation incurred in fibre 145.

Controller 110 may thereafter control dual-rail encoder 120, based on the compensation adjustment information, to pre-compensate for rotation incurred in fibre 145, so that light exiting fibre 145 at the receiver end is aligned with bases of receiver 150. In other words, controller 110 may control dual-rail encoder 120 to encode light with information desired to be communicated over fibre 145, pre-distorted, or pre-compensated, with the compensation adjustment information. The encoding performed by dual-rail encoder 120 therefore is a combination of the information to be communicated and the compensation adjustment information.

Using a test pattern comprising light in at least two polarizations and measuring it in at least two different bases may yield a complete characterization of rotation induced by fibre 145. Calibration of the system may be repeated at set intervals to allow for controlling a birefringence of fibre 145 that changes as a function of time.

Figure 2A:
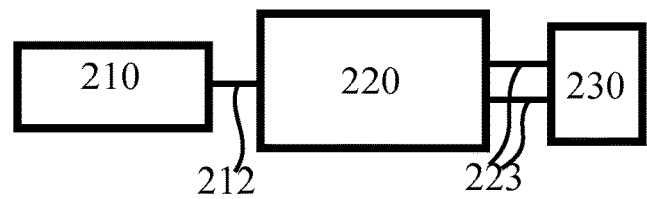
FIG. 2A illustrates generation of pre-compensated dual-rail states where encoding comprises primary dual-rail encoding and a compensation stage.

FIG. 2A illustrates generation of pre-compensated dual-rail states where encoding comprises primary dual-rail encoding and a compensation stage. In the example system of FIG. 2A, a light source 210 feeds light to a primary dual-rail encoder 220. Light source 210 may essentially resemble light source 160 of FIG. 1B, and feed light to primary dual-rail encoder 220 via connection 212. Primary dual-rail encoder 220 is illustrated in more detail in FIG. 2B. Primary dual-rail encoder 220 feeds dual-rail encoded light to compensation stage 230 via connection 223, where, based on the compensation adjustment information, the light is adjusted so as to pre-compensate for rotation incurred in a fibre so that light exiting the fibre at the receiver end is aligned with bases of the receiver. Compensation stage 230 is illustrated in more detail in FIG. 2C. In the FIG. 2A solution, dual-rail encoding comprises also the adjustment performed in compensation stage 230, the dual-rail encoder of FIG. 2A overall comprises both primary dual-rail encoder 220 and compensation stage 230.

Figure 2B:
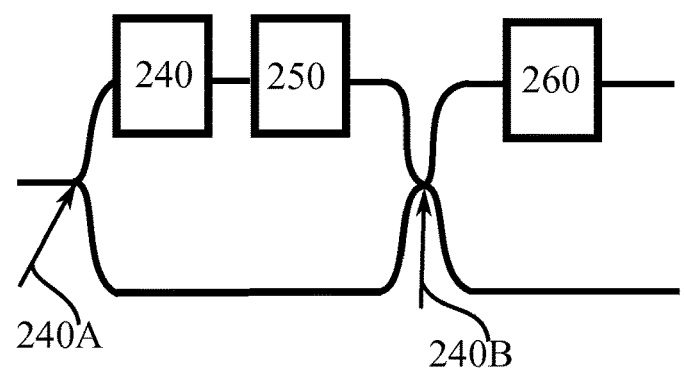
FIG. 2B illustrates an example embodiment of primary dual-rail encoder 220 of FIG. 2A.

FIG. 2B illustrates an example embodiment of primary dual-rail encoder 220 of FIG. 2A. In the illustrated example, encoding is performed by three phase shifters 240, 250 and 260, which may each be controlled by a two-level voltage. Phase shifter 250 may be twice as long as phase shifter 240. If the length of the phase shifters is appropriately chosen, the two voltage levels could be the same for the three phase shifters. This is why phase shifter 250 may be configured as twice as long: the difference between the two voltages is set to induce a difference of pi in the phase while this phase difference is pi/2 for phase shifters 240 and 260. In FIG. 2B, arrow 240A denotes a 1×2 coupler and arrow 240B denotes a 2×2 coupler.

TABLE 1

In two-level voltage encoding, 0 and 1 denote low and high voltages in phase shifters 240, 250 and 260, to generate six states.

| | 240 | 250 | 260 | |
|---|---|---|---|---|
| x+ | 0 | 0 | 0 | \|0> + \|1> |
| x− | 0 | 1 | 0 | \|0> − \|1> |
| y+ | 0 | 0 | 1 | \|0> + i\|1> |
| y− | 0 | 1 | 1 | \|0> − i\|1> |

TABLE 1-continued

In two-level voltage encoding, 0 and 1 denote low and high voltages in phase shifters 240, 250 and 260, to generate six states.

| | 240 | 250 | 260 | |
|---|---|---|---|---|
| z+ | 1 | 0 | 0/1 | \|0> |
| z− | 1 | 1 | 0/1 | \|1> |

Figure 2C:
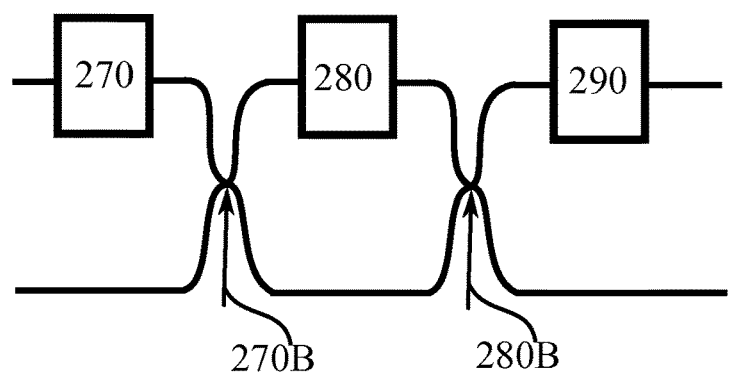
FIG. 2C illustrates an example embodiment of compensation stage 230 of FIG. 2A.

FIG. 2C illustrates an example embodiment of compensation stage 230 of FIG. 2A. Phase shifters 270, 280 and 290 may be configured, by a controller, to pre-compensate for any polarization rotation incurred in a fibre, before the light is emitted into the fibre, so that light exiting the fibre at the receiver end is aligned with bases of the receiver. The illustrated compensation stage may be configured to receive as input from the left-hand-side of the figure an output of primary dual-rail encoder 220.

Compared to the embodiments of FIGS. 1A-1C, the embodiments of FIGS. 2A-2C benefit from having a compensation stage that can be adapted to change slower, whereas in FIGS. 1A-1C, the phase shifters may need to be controlled on a faster time scale. The encoder of FIGS. 2A-2C may be operated using a two-voltage configuration as described above.

Figure 3:
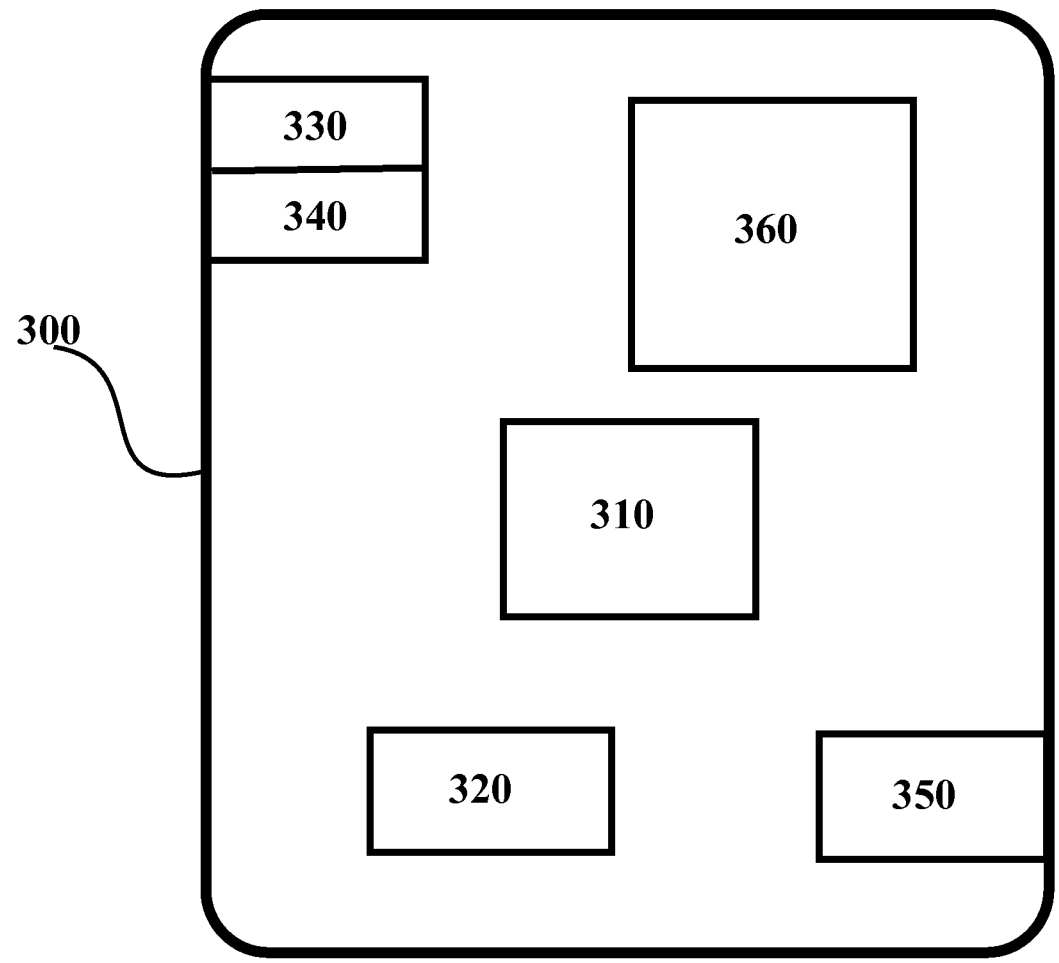
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, an emitter device such as the emitter of FIG. 1A or FIG. 2A. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate with an optic fibre.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard or a touchscreen.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

FIGS. 4A-4D illustrate example embodiments of combiners capable of converting dual-rail encoded light to polarization-encoded light. FIG. 4A illustrates an on-chip polarization rotator combiner. Comprised in this device are polarization rotator 410, birefringent waveguide 420 and coupler 430. Coupler 430 may comprise a 1×2 or 2×2 coupler.

FIG. 4B illustrates a second example of an on-chip polarization rotator combiner. Illustrated are polarization rotator 440, birefringent waveguides 450 and coupler 460. Coupler 460 may comprise a 1×2 or 2×2 coupler.

FIG. 4C illustrates an on-chip silicon in-plane polarization rotator combiner, and FIG. 4D illustrates an on-chip silicon out-of-plane polarization rotator combiner coupler.

Figure 5:
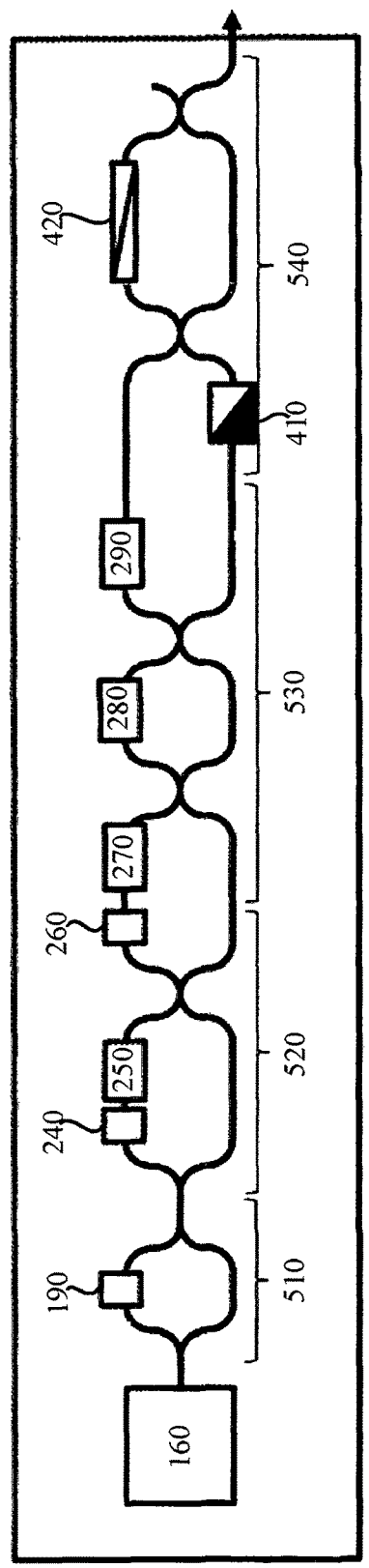
FIG. 5 illustrates an example emitter-side assembly.

FIG. 5 illustrates an example emitter-side assembly. Reference numbers 160, 190, 240, 250, 260, 270, 280, 290, 410 and 420 denote similar structures as like reference numbers in FIGS. 1A-1C, 2A-2C and 4A-4D. Overall, phase 510 comprises an amplitude modulation phase, phase 520 comprises a primary encoding phase, phase 530 comprises a pre-compensation phase and phase 540 comprises a polarization rotation combination phase.

Figure 6:
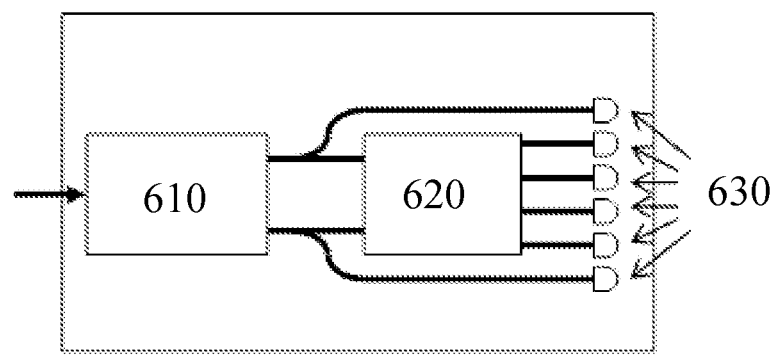
FIG. 6 illustrates an example receiver architecture.

FIG. 6 illustrates an example receiver architecture. In the example, light advances into the receiver from the left, and is converted from polarization-modulated to dual-rail encoded form by polarization beam splitter-rotator 610. 90-degree hybrid 620 feeds light to four of detectors 630, while two of detectors 630 receive light directly from polarization beam splitter-rotator 610. Even though the polarization rotation-combination is possible on some platforms, they may be difficult and may require additional fabrication steps. This is why in an implementation shown in FIG. 6, dual-rail preparation is performed on-chip and the conversion to polarization states is performed with a fibre coupled polarization beam splitter. The two input fibres may be polarization maintaining and the output fibre may be a standard single-mode, not polarization maintaining, fibre in order to reduce birefringence.

The receiver part may be configured to perform measurements of the qubits in at least two different bases. This could be done by measuring the polarization state by using free space or fibre coupled elements, however on-chip integration provides benefits in terms of dimensions and stability. Dual-rail manipulation of the qubit may be performed on a chip. Polarization states may be converted to dual-rail states and measured in at least two different bases. FIG. 6 shows a receiver using a reversed polarization rotator combiner, as shown in FIGS. 4A-4D, to convert polarization states into dual rail states and a design performing the measurements on three unbiased bases. To do so, part of the light is tapped from the two-rail just after the conversion to dual-rail and measured with two detectors. This constitutes the first measurement basis. The two other unbiased bases are obtained by using an optical 90-degree hybrid 620. An advantage of measuring the qubits in three unbiased bases is that it is a robust way to characterize the fibre-induced polarization rotations as well as the depolarization that could be induced by, for example, dispersion of the fibre. A convenient technology to implement this receiver could be Silicon on Insulator, for example. The polarization-encoded to dual-rail-encoded conversion could be performed by out-of-plane coupler shown in FIG. 4, for example. The 90-degree hybrid 620 may be implemented by a 4×4 multimode Interferometer, MMI. The detectors could be implemented by depositing superconducting nanowire single photon detectors on silicon waveguides, for example.

Transmission in the fibre may have three types of effect on qubits: loss, rotation and depolarization. These three effects can be extracted from a measurement in three different bases as in the case of FIG. 6.

A pure qubit state will end-up in a somewhat mixed state after transmission. That is why it is convenient to use a density matrix formalism to calculate how a qubit state evolves.

Losses cannot be compensated in some embodiments of quantum key distribution, QKD, as the average number of emitted photons may be limited by the security requirements. They will thus be left aside in the calculations by normalizing the results.

Any rotation, for example any angle about any axis can be performed by the compensation stage described in FIG. 2C by choosing the appropriate phase shifts $\phi_1$, $\phi_2$ and $\phi_3$. The unitary performed by this stage is, up to a global phase:

$$U_c = \tfrac{1}{2} e^{i\sigma_z \phi_3/2}(1+i\sigma_x) e^{i\sigma_z \phi_2/2}(1+i\sigma_x) e^{i\sigma_z \phi_1/2},$$

In order to facilitate the calculation of the phase shifts that we need to apply to compensate for the fibre rotations, we choose to express the fibre unitary in the same form as the compensation unitary:

$$U_f = \tfrac{1}{2} e^{i\sigma_z \gamma/2}(1+i\sigma_x) e^{i\sigma_z \beta/2}(1+i\sigma_x) e^{i\sigma_z \alpha/2},$$

where the $\sigma$ are the Pauli matrices and $\alpha$, $\beta$ and $\gamma$ are the unknown rotation angles induced by the fibre. Those are the values we need to retrieve from the measurements in order to perform the pre-compensation.

The action of the unitary on different input states in density matrix notation can be written as $$\rho_n = \tfrac{1}{2}(1 + n \cdot \sigma)$$

where n is a unit vector in the corresponding direction on the Bloch sphere and σ is the vector of the Pauli matrices. Particularly we want to consider the six directions given by the unit vectors $\mp x$, $\mp y$, $\mp z$.

The effect of depolarization on the qubits can be written as $$\rho_f = P[U_c \cdot \rho_n \cdot U_c^+],$$

where we have introduced a depolarising channel, given by the super-operator $$P[\rho] = \frac{1-p}{4}(\sigma_x \rho \sigma_x + \sigma_y \rho \sigma_y + \sigma_z \rho \sigma_z) + \frac{1+3p}{4}\rho$$

and the parameter p giving the polarisation.

The normalized number of counts in a detector measuring the density matrix ρf in direction m is then given by $$N_m = Tr(\rho_f \rho_m).$$

In one implementation, the emitter will be able to produce six states from three unbiased bases and the receiver performs measurements in three unbiased bases. For the six choices of input states and six choices of measurement directions m, n=∓x, ∓y, ∓z we obtain a (normalised) 6×6 measurement matrix $$M = \frac{1}{2}\begin{pmatrix} 1+p\sin\alpha\sin\gamma + p\cos\alpha\cos\beta\cos\gamma & 1-p\sin\alpha\sin\gamma - p\cos\alpha\cos\beta\cos\gamma & 1-p\cos\alpha\sin\gamma + p\sin\alpha\cos\beta\cos\gamma & 1+p\cos\alpha\sin\gamma - p\sin\alpha\cos\beta\cos\gamma & 1+p\sin\beta\cos\gamma & 1-p\sin\beta\cos\gamma \\ 1-p\sin\alpha\sin\gamma - p\cos\alpha\cos\beta\cos\gamma & 1+p\sin\alpha\sin\gamma + p\cos\alpha\cos\beta\cos\gamma & 1+p\cos\alpha\sin\gamma - p\sin\alpha\cos\beta\cos\gamma & 1-p\cos\alpha\sin\gamma + p\sin\alpha\cos\beta\cos\gamma & 1-p\sin\beta\cos\gamma & 1+p\sin\beta\cos\gamma \\ 1+p\sin\alpha\cos\gamma - p\cos\alpha\cos\beta\sin\gamma & 1-p\sin\alpha\cos\gamma + p\cos\alpha\cos\beta\sin\gamma & 1-p\cos\alpha\cos\gamma - p\sin\alpha\cos\beta\sin\gamma & 1+p\cos\alpha\cos\gamma + p\sin\alpha\cos\beta\sin\gamma & 1-p\sin\beta\sin\gamma & 1+p\sin\beta\sin\gamma \\ 1-p\sin\alpha\cos\gamma + p\cos\alpha\cos\beta\sin\gamma & 1+p\sin\alpha\cos\gamma - p\cos\alpha\cos\beta\sin\gamma & 1+p\cos\alpha\cos\gamma + p\sin\alpha\cos\beta\sin\gamma & 1-p\cos\alpha\cos\gamma - p\sin\alpha\cos\beta\sin\gamma & 1+p\sin\beta\sin\gamma & 1-p\sin\beta\sin\gamma \\ 1+p\cos\alpha\sin\beta & 1-p\cos\alpha\sin\beta & 1+p\sin\alpha\sin\beta & 1-p\sin\alpha\sin\beta & 1-p\cos\beta & 1+p\cos\beta \\ 1-p\cos\alpha\sin\beta & 1+p\cos\alpha\sin\beta & 1-p\sin\alpha\sin\beta & 1+p\sin\alpha\sin\beta & 1+p\cos\beta & 1-p\cos\beta \end{pmatrix}$$

From these measurements it is more convenient to calculate the correlator matrix C, where each 4×4 subblocks of the matrix M is replaced by a single number.

For a subblock $$\begin{pmatrix} a & b \\ c & d \end{pmatrix}$$

the correlator is a+d−b−c.

$$C = p\begin{pmatrix} \sin\alpha\sin\gamma + \cos\alpha\cos\beta\cos\gamma & -\cos\alpha\sin\gamma + \sin\alpha\cos\beta\cos\gamma & \sin\beta\cos\gamma \\ \sin\alpha\cos\gamma - \cos\alpha\cos\beta\sin\gamma & -\cos\alpha\cos\gamma - \sin\alpha\cos\beta\sin\gamma & -\sin\beta\sin\gamma \\ \cos\alpha\sin\beta & \sin\alpha\sin\beta & -\cos\beta \end{pmatrix}$$

We can see that the effect of depolarization quantified by the parameter p can be easily separated from the rotation terms and the value of the three rotation angles α, β and γ can be extracted.

In order to describe the rotation happening in the fibre, we choose to map the unknown parameters on the phase shifts performed by the compensation stage. Thus, we can directly deduce the required corrections $\phi_1$, $\phi_2$ and $\phi_3$ that need to be applied on the phase shifters from the measurement of α, β and γ (performed while $\phi_1$, $\phi_2$ and $\phi_3$ are set to zero). $\phi_1$, $\phi_2$ and $\phi_3$ should be equal to −α, −β and −γ, respectively. This first adjustment should get the received qubits almost aligned with the receivers fixed measurement basis.

At this point, the diagonal elements of the correlator matrix should be close to 1 and all the other elements should be close to zero. Further adjustments can be performed in a continuous way during the transmission of the key. Those adjustments may be calculated in a differential manner. The rotation performed by the pre-compensation stage as a function of the phase shifts is known:

$$Uc = f(\phi) \text{ with } \phi = (\phi_1, \phi_2, \phi_3)$$

The rotation induced by the fibre is also known in first approximation: Uf~Uc. It is then possible to calculate the differential changes induced by small changes on the phase shifts on the measurements. The most accurate indicators of the bases misalignment are the 6 non-diagonal elements of the correlator matrix because they are close to zero. Let's call C' the vector composed of the 6 values. We can calculate the matrix F such that C'=F(ϕ). The Jacobian of F quantifies the changes on the correlators induced by the adjustments of the phase shifts. In order to calculate the required adjustment, we can pick the 3 most significant correlators in order to have a square Jacobian. The required adjustments can be set as:

$$d\phi = -J^{-1}C'$$

The polarization based QKD described here may also, at least in some embodiments, be used in a multiplexed network where the transmission from several emitters and/or receivers use the same optic fibre. In that case each emitter must have a source with a different wavelength λ. In order to have an agile network it is may be chosen that each source can change its wavelength to use an available channel. The wavelength multiplexer must be polarization independent. Time multiplexing and routing could also be used.

Figure 7:
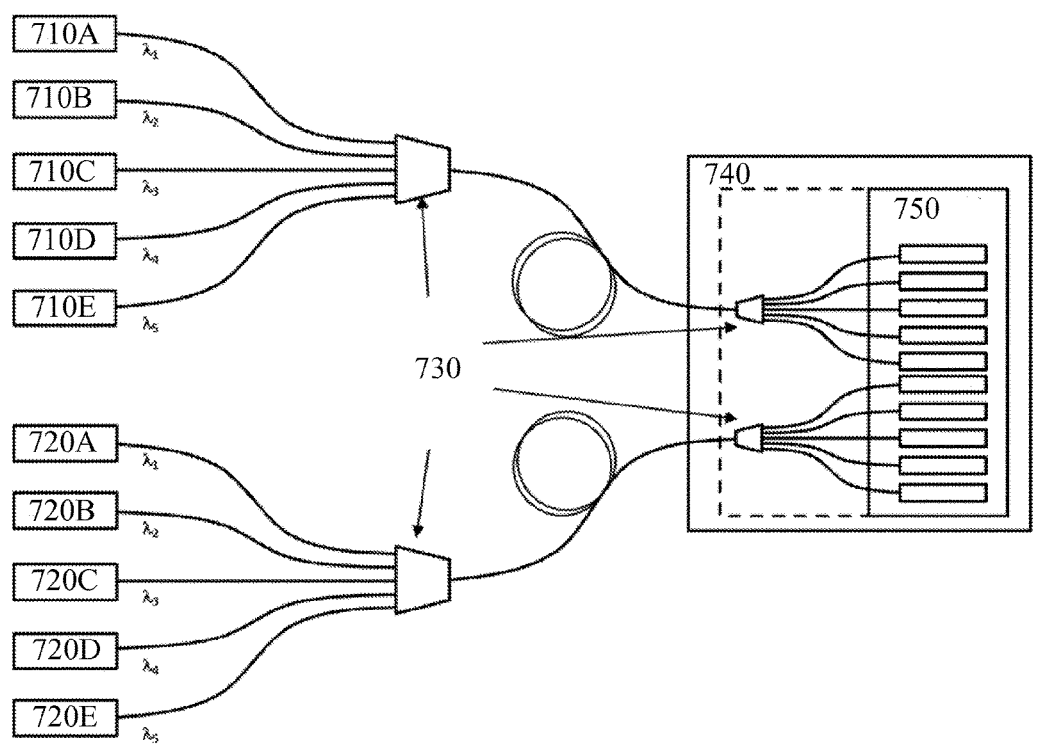
FIG. 7 illustrates a network where multiple users communicate at the same time with multiple receivers gathered in the same hub.

FIG. 7 illustrates a network where multiple users communicate at the same time with multiple receivers gathered in the same hub. This can be convenient in a type of network based on trusted nodes and also when the detectors need to be refrigerated. The cost of the protection of the trusted node and of the refrigeration can then be shared by a greater number of receivers. In this figure, the signals are demultiplexed with a polarization independent demultiplexer before being injected in a photonic chip. In that case each receiver may be similar to the one in FIG. 6. For some technologies the polarization independent demultiplexing could also be integrated on the chip, as suggested by the dashed line.

In FIG. 7, reference sign 710A denotes emitter 1a, 710B denotes emitter 2a, 710C denotes emitter 3a, 710D denotes emitter 4a and 710E denotes emitter 5a. Reference sign 720A denotes emitter 1b, 720B denotes emitter 2b, 720C denotes emitter 3b, 720D denotes emitter 4b and 720E denotes emitter 5b. The arrows denoted by reference sign 730 point to sections where polarization independent wavelength multiplexing and de-multiplexing occurs. 740 denotes a hub receiver, and 750 denotes a photonic chip with a plurality of receivers, from 1a to 5a and from 1b to 5b, corresponding to the emitters.

Figure 8:
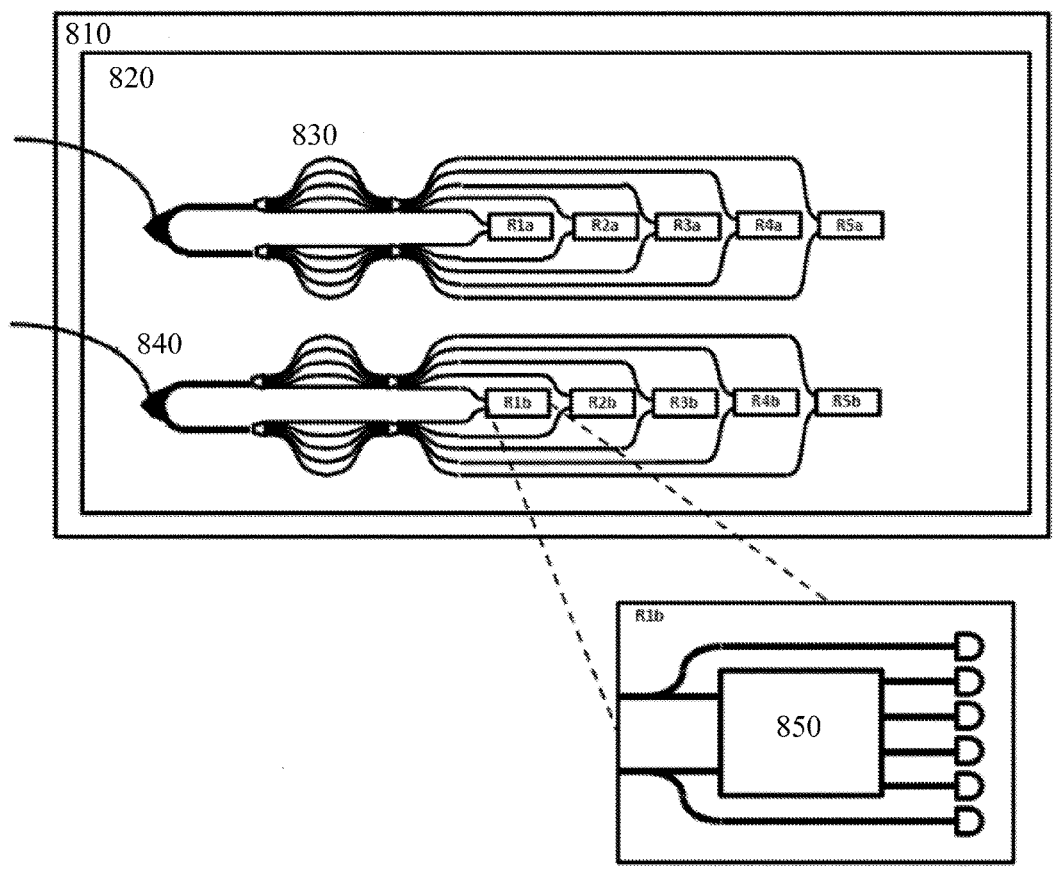
FIG. 8 illustrates an example embodiment where polarization splitting is done before demultiplexing.

FIG. 8 illustrates an example embodiment where polarization splitting is done before demultiplexing. Hub receiver 810 comprises photonic chip 820. On the photonic chip are arranged receivers R1a . . . R5a and R1b . . . R5b as in FIG. 7. Reference sign 830 denotes an arrayed waveguide grating, AWG, and reference sign 840 denotes an out-of-plane polarization splitter. A zoom of receiver R1b illustrates that the receiver has similar structure to the receiver of FIG. 6, with reference sign 850 denoting a 90-degree hybrid. In the embodiments according to FIG. 8, demultiplexing needn't have to be polarization independent.

Although discussed above in connection with an emitter, compensating for polarization rotation in a fibre may be implemented alternatively, or additionally, on the receiver side. In these embodiments, controller 110 may be comprised in the receiving end, and the receiver may be configured to, based on compensation adjustment information derived with a test pattern along the lines described above, correct for rotation incurred in a fibre. In the receiver end, the compensation may be performed on dual-rail encoded light, as is done when the compensating takes place in the emitter end.

Figure 9:
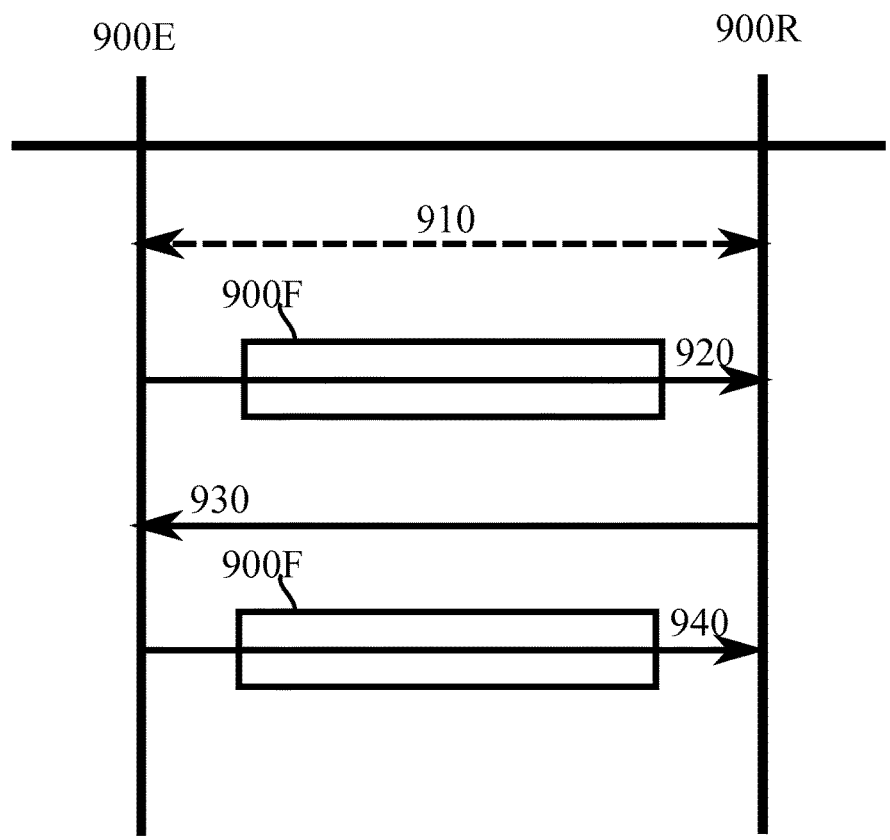
FIG. 9 is a signalling diagram illustrating signalling in accordance with at least some embodiments of the present invention.

FIG. 9 is a signalling diagram illustrating signalling in accordance with at least some embodiments of the present invention. The vertical axes correspond to emitter 900E and receiver 900R. Emitter 900E may correspond to an emitter similar to that illustrated in FIG. 1A or FIG. 2A, for example, and receiver 900R may correspond to receiver 150 of FIG. 1A, for example.

In phase 910, emitter 900E and receiver 900R exchange information, which may comprise information on characteristics of a test pattern, for example. Phase 910 may comprise authentication of at least one of emitter 900E and receiver 900R. Phase 910 is optional in the sense that not all embodiments in accordance with FIG. 9 comprise phase 910. For example, where receiver 900R already knows characteristics of the test pattern, it need not be separately informed of them. For example, a test pattern may be specified in an industry specification that is known at a time when receiver 900R is manufactured.

In phase 920, emitter 900E transmits the test pattern to receiver 900R through fibre 900F. Fibre 900F may comprise an optic fibre, the structure of which is described above. Receiver 900R detects the test pattern and measures its characteristics, for example in at least two bases. The test pattern may comprise light in at least two polarizations.

In phase 930, receiver 900R informs emitter 900E of results of measurements of the test pattern, which emitter 900E may take into use to subsequently pre-compensate in a dual-rail encoding phase for rotations incurred in fibre 900F. The communication of phase 930 may traverse fibre 900F or another connection arranged between emitter 900E and receiver 900R.

In phase 940, emitter 900E transmits, via fibre 900F, information to receiver 900R. The information transmitted in phase 940 may comprise information used to establish a shared secret, such as for example a secret key, between emitter 900E and receiver 900R. The transmission of phase 940 may be pre-compensated based at least in part on the information communicated in phase 930.

The test pattern transmission may be repeated at set intervals to allow dynamic adaptation to time-variant birefringence of fibre 900F.

Figure 10:
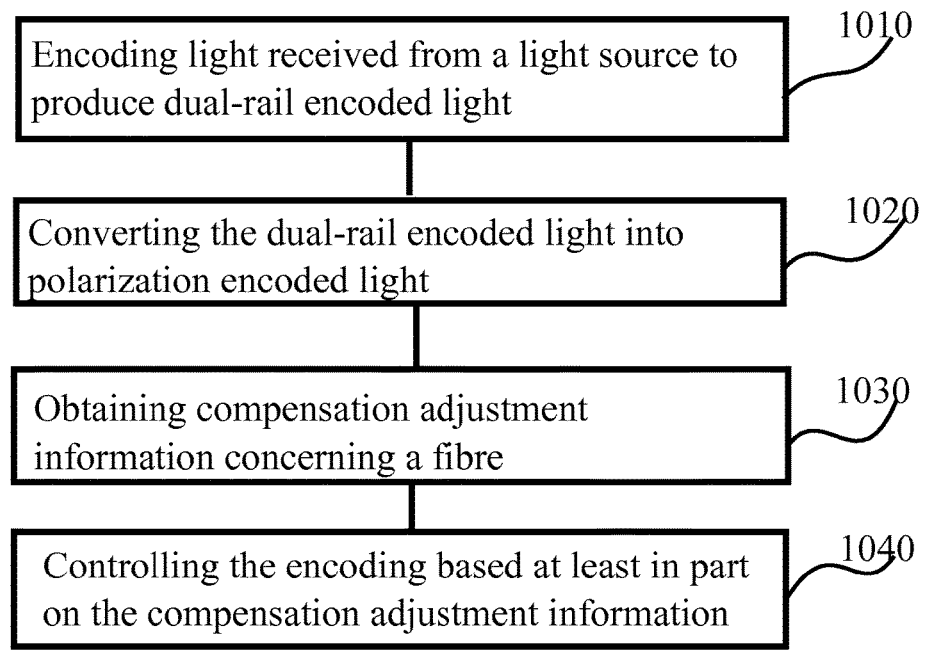
FIG. 10 is a first flow graph of a first method in accordance with at least some embodiments of the present invention.

FIG. 10 is a first flow graph of a first method in accordance with at least some embodiments of the present invention. The phases of the illustrated first method may be performed in an emitter, for example. Phase 1010 comprises encoding light received from a light source to produce dual-rail encoded light. Phase 1020 comprises converting the dual-rail encoded light into polarization encoded light. Phase 1030 comprises obtaining compensation adjustment information concerning a fibre. Finally, phase 1040 comprises controlling the encoding based at least in part on the compensation adjustment information. Obtaining compensation adjustment information concerning the fibre may comprise deriving the compensation adjustment information concerning the fibre.

Figure 11:
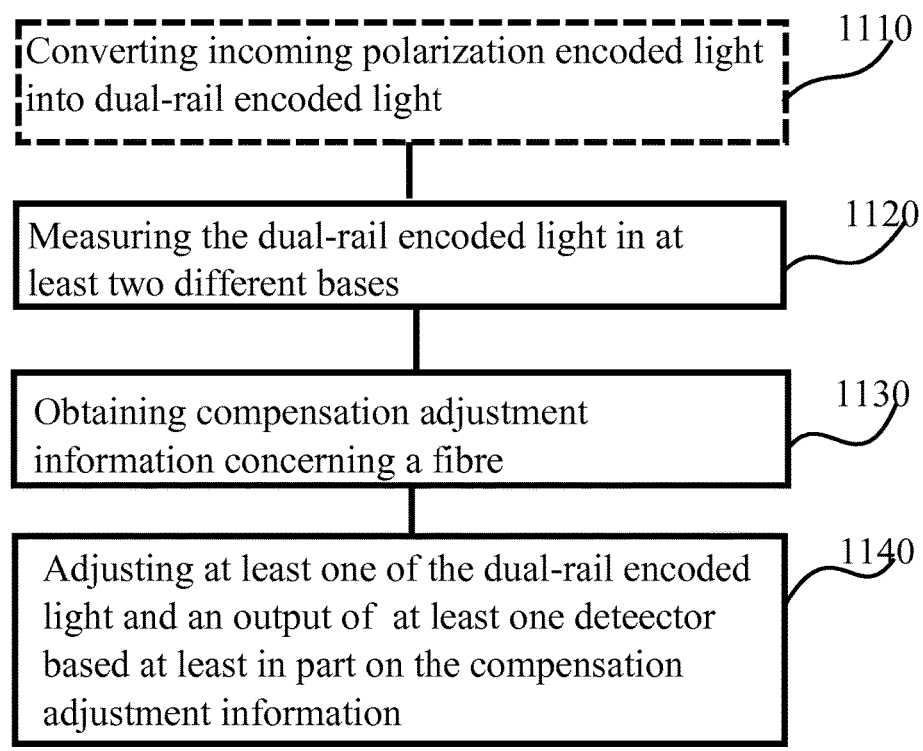
FIG. 11 is a second flow graph of a second method in accordance with at least some embodiments of the present invention.

FIG. 11 is a second flow graph of a second method in accordance with at least some embodiments of the present invention. The phases of the illustrated first method may be performed in a receiver, for example. Optional phase 1110 comprises converting incoming polarization encoded light to dual-rail encoded light. Phase 1120 comprises measuring encoded light in at least two different bases. In embodiments comprising optional phase 1110, the measured encoded light is dual-rail encoded light. Phase 1130 comprises obtaining compensation adjustment information concerning a fibre. Finally, phase 1140 comprises adjusting at least one of the encoded light and an output of at least one detector based at least in part on the compensation adjustment information. Obtaining compensation adjustment information concerning the fibre may comprise deriving the compensation adjustment information concerning the fibre.

An advantage of pre-compensating for rotations incurred in a fibre in a dual-rail encoded phase, rather than in a polarization encoded phase, is that a compact, integrated implementation on a chip for at least one of the emitter and the receiver is possible. Truly efficient compensation in polarization encoded phase typically requires controlling polarization of light in the receiver, using fibre straining or free space, which is bulky.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
   a dual-rail encoder configured to receive light from a light source and to output dual-rail encoded light, the dual-rail encoder configured to at least pre-compensate, based on feedback information from a receiver detecting polarization rotation via qubits of at least two different bases in received dual-rail encoded light;
   a combiner, coupled to the dual-rail encoder, configured to at least convert the pre-compensated dual-rail encoded light into polarization encoded light for transmission; and
   a controller configured to obtain at least the feedback information including compensation adjustment information and to at least control, based at least in part on the compensation adjustment information, the dual-rail encoder to pre-compensate for the polarization rotation.

2. The apparatus of claim 1, wherein the controller is configured to at least obtain the compensation adjustment information by at least causing the apparatus to transmit first polarization-encoded light via a fiber, to receive the feedback concerning reception of the transmitted first polarization-encoded light, and to at least compare the feedback to information concerning the first polarization-encoded light.

3. The apparatus of claim 1, wherein the dual-rail encoder is configured to at least modify at least one of amplitude and phase properties of the light received from the light source.

4. The apparatus of claim 1, wherein the dual-rail encoder comprises at least one phase shifter.

5. The apparatus of claim 1, wherein the at least one phase shifter is configurable by applying at least one of a voltage and an optical signal.

6. The apparatus of claim 1, wherein the dual-rail encoder comprises at least one coupler.

7. The apparatus of claim 1, wherein the combiner comprises a fiber-based polarization beam splitter.

8. The apparatus of claim 1, wherein the apparatus further comprises an attenuator configured to reduce an intensity of at least one of the dual-rail encoded light, polarization encoded light, and the light from the light source to a single-photon regime.

9. An apparatus comprising:
   a polarization rotator configured to at least convert received polarization-encoded and dual-rail encoded light to the dual-rail encoded light; and
   at least one decoder configured to measure polarization rotation in the dual-rail encoded light via qubits of at least two different bases, the polarization rotation incurred during transmission of the received light to the apparatus.

10. The apparatus according to claim 9, wherein the at least one decoder comprises at least one single photon detector or one photo-detector.

11. The apparatus according to claim 9, further comprising at least one processing core is configured to at least obtain the compensation adjustment information by comparing a first output of the at least one decoder to first information received from a second apparatus, the first information characterizing a transmission of light that the at least one decoder measured to produce the first output.

12. The apparatus according to claim 11, wherein the compensation adjustment information corrects a distortion caused by birefringence of a fiber.

13. A method, comprising:
   encoding, based on compensation information, light received from a light source to produce dual-rail encoded light;
   converting the dual-rail encoded light into polarization encoded light;
   obtaining the compensation adjustment information, the compensation information including feedback information from a receiver detecting polarization rotation via qubits of at least two different bases in received dual-rail encoded light; and
   controlling the encoding based at least in part on the compensation adjustment information.

14. The method of claim 13, wherein obtaining the compensation adjustment information comprises transmission of first polarization-encoded light a fiber, receiving feedback concerning reception of the transmitted first polarization-encoded light and comparing the feedback to information concerning the first polarization-encoded light.

15. The method of claim 13, wherein the encoding comprises modifying at least one of amplitude and phase properties of the light received from the light source.

16. The method of claim 13, wherein the encoding comprises using at least one phase shifter.

17. The method of claim 16, wherein using the at least one phase shifter comprises applying at least one of a voltage and an optical signal to the at least one phase shifter.

18. The method of claim 13, wherein the converting comprises using a fiber-based polarization beam splitter.

19. The method of claim 13, further comprising reducing an intensity of at least one of the dual-rail encoded light, polarization encoded light, and the light from the light source to a single-photon regime.

20. A method comprising:
- measuring polarization rotation in dual-rail encoded light via qubits of at least two different bases;
- obtaining, based on the measured polarization rotation, compensation adjustment information; and
- causing adjusting of at least one of the dual-rail encoded light and an output of at least one detector based at least in part on the compensation adjustment information.

21. The method according to claim 20, wherein the measuring comprises using at least one detector, the at least one detector comprising at least one single photon detector or one photo-detector.

22. The method according to claim 20, wherein the compensation adjustment information is obtained by comparing a first output of the measuring to first information received from a second apparatus, the first information characterizing a transmission of light that is measured to produce the first output.

23. The method according to claim 20, wherein the compensation adjustment information corrects a distortion caused by birefringence of a fiber.

24. A non-transitory computer readable medium having stored thereon a set of computer readable instructions that, when executed by at least one processor, cause an apparatus to at least:
- encode, based on compensation information, light received from a light source to output dual-rail encoded light;
- convert the dual-rail encoded light into polarization encoded light;
- obtain the compensation adjustment information, the compensation information including feedback information from a receiver detecting polarization rotation via qubits of at least two different bases in received dual-rail encoded light; and
- control the encoding based at least in part on the compensation adjustment information.

25. A non-transitory computer readable medium having stored thereon a set of computer readable instructions that, when executed by at least one processor, cause an apparatus to at least:
- measure polarization rotation in dual-rail encoded light via qubits of at least two different bases;
- obtain, based on the measured polarization rotation, compensation adjustment information; and
- cause adjusting of at least one of the dual-rail encoded light and an output of at least one detector based at least in part on the compensation adjustment information.

* * * * *